United States Patent
Osaki et al.

(10) Patent No.: US 9,748,530 B2
(45) Date of Patent: Aug. 29, 2017

(54) LID FOR STORAGE BATTERY, INJECTION MOLDING METHOD OF THE SAME LID, STORAGE BATTERY WITH THE SAME LID, AND TERMINAL SECTION FOR STORAGE BATTERY

(75) Inventors: Shin Osaki, Kyoto (JP); Hiroshi Haruyama, Kyoto (JP); Eiji Hojo, Kyoto (JP); Yasuhide Nakayama, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 1134 days.

(21) Appl. No.: 13/518,608

(22) PCT Filed: Dec. 22, 2010

(86) PCT No.: PCT/JP2010/073095
§ 371 (c)(1),
(2), (4) Date: Jun. 22, 2012

(87) PCT Pub. No.: WO2011/078209
PCT Pub. Date: Jun. 30, 2011

(65) Prior Publication Data
US 2012/0264002 A1    Oct. 18, 2012

(30) Foreign Application Priority Data
Dec. 24, 2009  (JP) ................................. 2009-292977
Dec. 24, 2009  (JP) ................................. 2009-292978

(51) Int. Cl.
*H01M 2/30* (2006.01)
*H01M 2/22* (2006.01)
(Continued)

(52) U.S. Cl.
CPC ........... *H01M 2/043* (2013.01); *H01M 2/305* (2013.01)

(58) Field of Classification Search
None
See application file for complete search history.

(56) References Cited

U.S. PATENT DOCUMENTS 4,701,386 A * 10/1987 Kump .................. H01M 2/307
                                                                429/179
4,898,796 A *  2/1990 Furukawa .............. H01M 2/06
                                                                429/178
(Continued)

FOREIGN PATENT DOCUMENTS

JP      08-273656       10/1996
JP      11-339765     * 12/1999 .............. H01M 2/30
(Continued)

OTHER PUBLICATIONS

International Search Report dated Apr. 12, 2011.

*Primary Examiner* — Ula C Ruddock
*Assistant Examiner* — Amanda Barrow
(74) *Attorney, Agent, or Firm* — Rankin, Hill & Clark LLP (57) ABSTRACT

An object of the invention is to provide a lid for storage battery, an injection molding method of the lid, a storage battery with the lid, and a terminal section for storage battery, which can save trouble of inserting a nut into a cavity portion of a terminal, and can prevent falling of the nut at the time of connection of an external leading wire. In a lid for storage battery in which a terminal section for storage battery 8 made up of a terminal 4 having a cavity portion, a bushing 6, and a conductive portion 7 joining both is insert-molded in a lid made of synthetic resin, and a storage battery with the lid for storage battery, an anchor portion 4T is projected at a location excluding at least a central portion of a bottom portion 4F of the terminal 4, and a nut is inserted into the cavity portion of the terminal to be fixed. Moreover, in the terminal section for storage battery, (Continued)

the anchor portion 4T is projected at the location excluding at least the central portion of the bottom portion 4F of the terminal 4 (e.g., the U-shaped anchor portion 4T is projected with a U-shaped joining portion 4G interposed).

20 Claims, 5 Drawing Sheets

(51) Int. Cl.
    *B29C 45/14*     (2006.01)
    *H01M 2/04*     (2006.01)

(56) References Cited

U.S. PATENT DOCUMENTS

| | | | | |
|---|---|---|---|---|
| 5,093,215 | A * | 3/1992 | Hasegawa | H01R 4/36 |
| | | | | 429/121 |
| 7,163,763 | B2 * | 1/2007 | Spiegelberg | H01M 2/305 |
| | | | | 29/730 |
| 2001/0049053 | A1 * | 12/2001 | Hasegawa | H01M 2/307 |
| | | | | 429/121 |
| 2002/0114994 | A1 * | 8/2002 | Yabuki | H01M 2/305 |
| | | | | 429/178 |
| 2003/0186121 | A1 * | 10/2003 | Wang | H01R 4/302 |
| | | | | 429/178 |
| 2003/0198867 | A1 * | 10/2003 | Kim | H01M 2/305 |
| | | | | 429/178 |
| 2004/0079738 | A1 * | 4/2004 | Sakamoto | H01M 2/307 |
| | | | | 219/121.82 |
| 2005/0175893 | A1 * | 8/2005 | Kawada | H01M 2/305 |
| | | | | 429/178 |
| 2009/0042098 | A1 * | 2/2009 | Nakayama | H01M 2/043 |
| | | | | 429/179 |
| 2011/0039153 | A1 * | 2/2011 | Nakayama | H01M 2/043 |
| | | | | 429/181 |

FOREIGN PATENT DOCUMENTS

| | | | | |
|---|---|---|---|---|
| JP | 2002-134098 | | 5/2002 | |
| JP | 2003-077454 | * | 3/2003 | ............ H01M 2/30 |
| JP | 2009-266626 | | 11/2009 | |
| WO | 2009/131228 | | 10/2009 | |
| WO | WO 2009/131228 | * | 10/2009 | ............ H01M 2/06 |

* cited by examiner

CHAMFERED TO PREVENT VERTICAL AND LATERAL WRONG INSERTION

FIG. 6(b)

STEPPED TO PREVENT VERTICAL AND LATERAL WRONG INSERTION

LID FOR STORAGE BATTERY, INJECTION MOLDING METHOD OF THE SAME LID, STORAGE BATTERY WITH THE SAME LID, AND TERMINAL SECTION FOR STORAGE BATTERY

TECHNICAL FIELD

The present invention relates to a storage battery especially suitable for mounting on a motorcycle, and particularly to a lid for a storage battery, a storage battery with the lid, and a terminal section for the storage battery.

BACKGROUND ART

In the above-mentioned storage battery suitable for mounting on the motorcycle, tubular bushings are included inside a lid, a pole projected upwardly from a container side being inserted into and welded to each of the tubular bushings, and terminals arranged in notched portions formed on a horizontal front side from the bushings are joined to the bushings, by which a vertically compact storage battery preventing the terminals from protruding from the lid can be constructed. The above-described constitution has an advantage of making an output larger than that of a conventional storage battery, when the storage battery of a size similar to the conventional one is constructed, and has been used in recent years.

Figure 7:
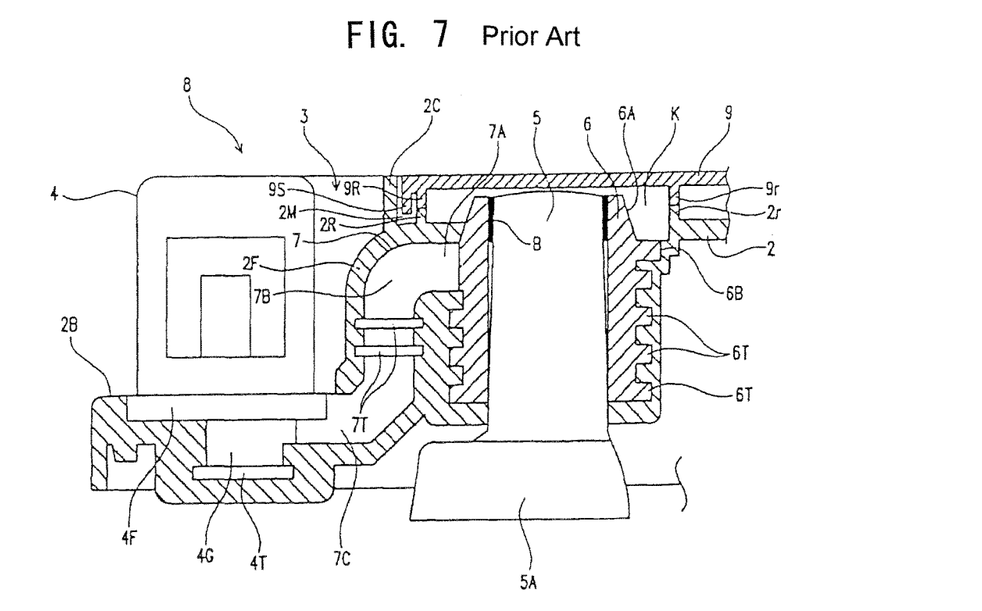
FIG. 7 is a cross-sectional view of a terminal section buried in a lid with a conventional auxiliary lid attached.

As the above-described storage battery, as shown in FIG. 7, there is publicly known a storage battery in which a notched portion 3 or a depressed portion is formed in a lid 2 made of synthetic resin to close a container and a terminal 4 is included in the notched portion 3 or the depressed portion, a tubular bushing 6 is included inside the lid 2, into which a pole 5 extending from the container to extract electric power is inserted to be welded, a conductive portion 7 to join an upper side of this bushing 6 and a lower side of the terminal 4 horizontally apposed to the bushing 6 is included, an auxiliary lid 9 to cover the bushing 6 included inside the lid 2 from above is included, wherein the terminal 4, the bushing 6 and the conductive portion 7 make up a terminal section 8 by integral molding, an annular protruded portion 7T protruded outwardly on a side surface of the conductive portion 7 is included, and in the terminal section 8, at least a lower portion 6B of the bushing 6 and the conductive portion 7 are buried in the lid 2 by insert molding (refer to Patent Document 1).

Moreover, a storage battery with a similar structure is also described in Patent Document 2.

In the storage battery described in Patent Document 1, no nut is fixed to the terminal 4.

Figure 8:
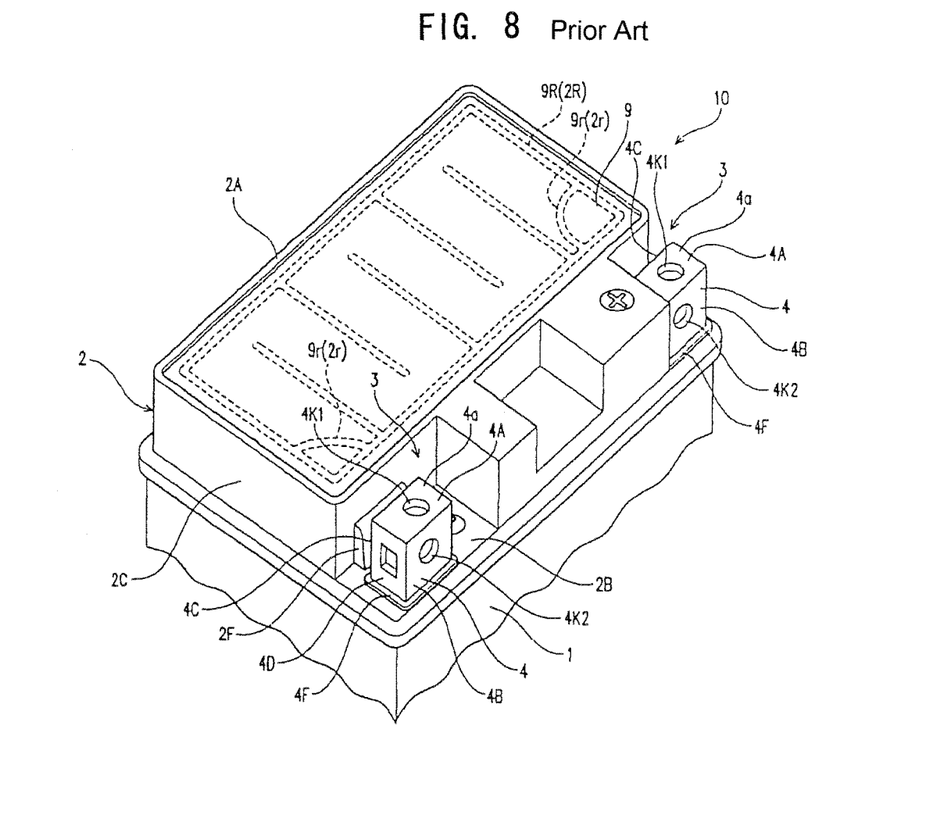
FIG. 8 is a perspective view showing an upper side of a conventional storage battery.

As described in a paragraph [0017] of Patent Document 1, a connection of an external leading wire to the above-described storage battery is made by positioning a nut in an internal portion (cavity portion) of the terminal 4 (inserting the nut in a rectangular parallelepiped shape into the cavity portion from a square socket of a left plate portion 4D of the terminal 4 shown in FIG. 8), and inserting bolts from through-holes 4K1, 4K2 formed in a top plate portion (upper surface plate portion) 4A and a front plate portion (front surface plate portion) 4B and screwing the same. In order to prevent the terminal section 8 from coming off from the resin by a torque during tightening, as shown in FIG. 7 and as described in a paragraph [0016], a plate-like oval anchor portion 4T, which is buried in the resin at the time of lid molding to exert an anchor effect, is integrally formed at a lower end of the terminal 4. The anchor portion 4T is integrally formed with a dimension larger than a joining portion 4G in a planar view at a lower end of the joining portion 4G extending integrally downwardly from a flat plate-like bottom portion 4F formed integrally at the lower end of the terminal 4.

Moreover, in Patent Document 2, as to the anchor portion, while there is a description (in a paragraph [0066]), "while in FIGS. 9(b), 9(c), a bottom surface of the anchor portion 4T is flat, when synthetic resin is insert-molded into the terminal section 8, if a die to fix the terminal section 8 has a projected portion, a depressed portion that reaches the joining portion 4G from a bottom surface center of the anchor portion 4T may be provided, so that the projected portion is fitted into the depressed portion, and similarly, if the die to fix the terminal section 8 has a depressed portion, a conical projected portion whose center is projected may be provided in the bottom surface of the anchor portion 4T, so that the projected portion is fitted into the depressed portion". There, however, is no suggestion that the anchor portion is projected at a location excluding at least a central portion of the bottom portion of the terminal.

Since the nuts described in Patent Documents 1 and 2 each have one screw hole, and the bolt can be inserted only from any one of the through-holes 4K1, 4K2 of the terminal, orientation of the nut needs to be changed in each case so as to match the through-hole to which the external leading wire is desired to be connected, and the screw hole of the nut, and thus, there have been problems that it takes a lot of trouble to insert the nut into the cavity portion of the terminal at the time of connection of the external leading wire, and that the nut falls.

Furthermore, at the lower end of the terminal described in Patent Documents 1 and 2, the above-described anchor portion is integrally formed with the joining portion interposed, and the nut inserted into the cavity portion cannot be fixed by deforming the lower end (bottom portion) of the terminal.

RELATED ART DOCUMENTS

Patent Documents

Patent Document 1: Japanese Patent Application Laid-Open No. 2009-043441
Patent Document 2: WO 2009-131228 A1

SUMMARY OF THE INVENTION

Problems to be Solved by the Invention

The present invention is to solve the above-described problems, and an object thereof is to provide a lid for a storage battery, an injection molding method of the lid, a storage battery with the lid, and a terminal section for the storage battery, which can save trouble of inserting a nut into a cavity portion of a terminal, and prevent falling of the nut at the time of connection of an external leading wire.

Means for Solving the Problems

The present invention employs the following means in order to solve the above-described problems.
(1) A lid for a storage battery in which a terminal section made up of a terminal having a cavity portion, a bushing, and a conductive portion joining both is insert-molded in a lid made of synthetic resin, wherein a nut is inserted into the cavity portion of the terminal to be inserted-molded, by which the nut is fixed.

As is well-known, the bushing has a tubular shape, into which a pole extending from an element inside a container is inserted to be welded, and the terminal section is made up by integrally molding the terminal, the bushing and the conductive portion joining both.

(2) The lid for a storage battery according to the foregoing (1), wherein a bottom portion of the terminal is deformed by an injection molding pressure of the synthetic resin at the time of the insert molding, and the nut is pressed and fixed to the cavity portion of the terminal.

(3) The lid for a storage battery according to foregoing (1), wherein an anchor portion is projected at a location excluding at least a central portion of the bottom portion of the terminal.

(4) The lid for a storage battery according to the foregoing (3), wherein the anchor portion has a notch or a hole in a central portion, and is projected with a joining portion interposed, the joining portion having an equiform notch or hole.

(5) The lid for a storage battery according to the foregoing (4), wherein the anchor portion having the notch in the central portion has a U shape.

(6) The lid for a storage battery according to any one of the foregoing (3) to (5), wherein at least the central portion of the bottom portion of the terminal where the anchor portion is not projected is deformed, by which the nut is fixed to the cavity portion of the terminal.

(7) The lid for a storage battery according to any one of the foregoing (1) to (5), wherein the terminal and the nut inserted into the cavity portion of the terminal each have a rectangular parallelepiped shape, and through-holes of the terminal and screw holes of the nut communicating with the through-holes are formed at least at two locations of a location from a rectangular upper surface toward a lower surface, and a location from a rectangular front surface toward a back surface, and at positions where the holes do not intersect.

(8) An injection molding method of a lid for a storage battery, in which a terminal section made up of a terminal having a cavity portion, a bushing, and a conductive portion joining both is inserted into a molding die of a lid to injection-mold synthetic resin, wherein at the time of the injection molding of the lid of the synthetic resin, a nut is inserted into the cavity portion of the terminal to be injection-molded, and a bottom portion of the terminal is deformed by an injection molding pressure to thereby fix the nut to the cavity portion of the terminal.

(9) The injection molding method of the lid for a storage battery according to the foregoing (8), wherein in the bottom portion of the terminal, an anchor portion having a notch or a hole in a central portion is projected, and the bottom portion of the terminal corresponding to the notch or the hole is deformed.

(10) The injection molding method of the lid for a storage battery according to the foregoing (8) or (9), wherein the terminal and the nut to be inserted into the cavity portion of the terminal each have a rectangular parallelepiped shape, through-holes of the terminal are formed at least at two locations of a rectangular upper surface plate portion and a rectangular front surface plate portion, and screw holes of the nut are formed at least at two locations of a location from a rectangular upper surface toward a lower surface and a location from a rectangular front surface to a back surface, and at positions where the holes do not intersect, and the nut is inserted into the cavity portion of the terminal so that the through-holes of the terminal and the screw holes of the nut communicate with each other.

(11) A storage battery including a container made of synthetic resin in which an inside thereof is partitioned into a plurality of cells by partition walls, and an element is contained in each of the cells, and a lid made of synthetic resin to cover the container from above, wherein the storage battery comprises the lid for the storage battery according to any one of the foregoing (1) to (5).

(12) A terminal section for a storage battery which is made up of a terminal having a cavity portion into which a nut is inserted, a bushing, and a conductive portion joining both, wherein an anchor portion is projected at a location excluding at least a central portion of a bottom portion of the terminal.

(13) The terminal section for a storage battery according to the foregoing (12), wherein the anchor portion has a notch or a hole in a central portion, and is projected with a joining portion interposed, the joining portion having an equiform notch or hole.

(14) The terminal section for a storage battery according to the foregoing (13), wherein the anchor portion having the notch in the central portion has a U shape.

Effect of the Invention

In the present invention, by employing the means of insert-molding the lid for storage battery in the state where the nut is inserted into the cavity portion of the terminal, and employing the terminal section for storage battery in which the anchor portion is projected at the location excluding at least the central portion of the bottom portion of the terminal, the bottom portion of the terminal can be deformed at the time of insert molding to fix the nut to the cavity portion of the terminal, which can save the trouble of inserting the nut into the cavity portion of the terminal and can prevent falling of the nut at the time of connection of an external leading wire.

Furthermore, while since the nut is not lead or lead alloy, the nut inserted into the cavity portion needs to be separated at the time of recycle of the terminal made of lead or lead alloy, in the present invention, in which the nut is fixed by deforming the bottom portion of the terminal, the nut can be easily separated from the terminal by strongly hitting the inserted nut, which is preferable in terms of recycle.

BRIEF DESCRIPTION OF THE DRAWINGS

FIG. 5 (1) is a photograph showing a terminal of the storage battery of the present invention.

FIG. 5 (2) is a photograph showing a nut to be inserted into the terminal of the storage battery of the present invention.

MODE FOR CARRYING OUT THE INVENTION

Figure 1:
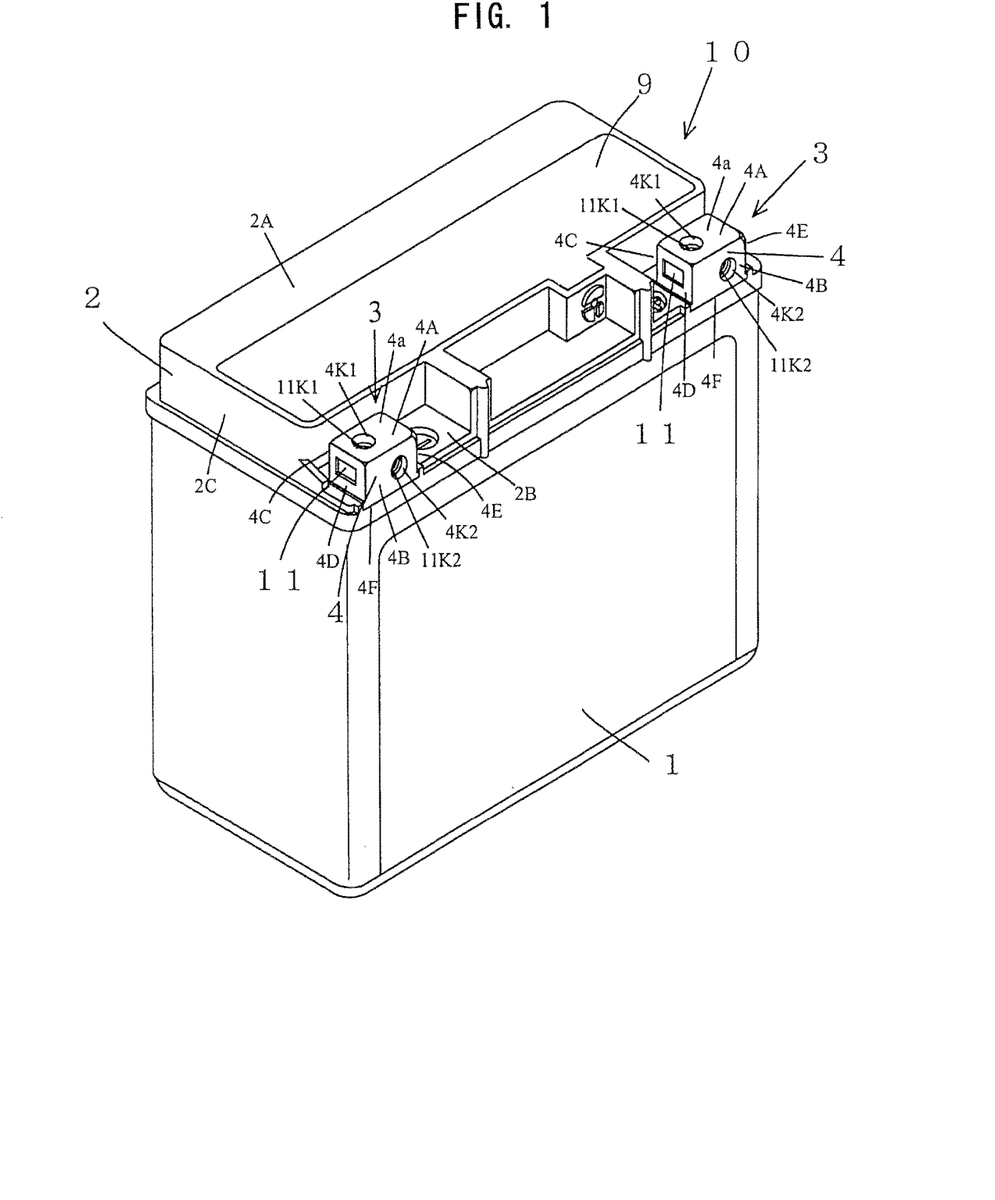
FIG. 1 is a perspective view of a storage battery or the present invention.

FIG. 1 shows a perspective view of a storage battery of the present invention. This storage battery 10 includes a container 1 having a rectangular shape in a planar view, a lid 2 made of synthetic resin and having a rectangular shape in a planar view to close an upper end opening of this container 1, and an auxiliary lid 9 to close an upper end opening of this lid 2.

As shown in FIG. 1, notched portions 3 are formed at the respective two corner portions on both sides of one long side of the lid 2 among four corner portions of the rectangular lid 2, and in these notched portions 3, 3 are arranged terminals 4, 4 respectively constituting a positive electrode and a negative electrode (the right terminal is a positive terminal, and the left terminal is a negative terminal), respectively, so that upper surfaces 4a, 4a of upper surface plate portions 4A, 4A of the terminals 4, 4 are not projected from an upper end 2A of the lid 2. While, here, the terminals 4, 4 are arranged in the notched portions 3, 3 formed at the corner portions of the lid 2, depressed portions may be formed in portions on the inner side of the lid 2, and the terminals 4, 4 may be arranged in these formed depressed portions, respectively.

According to the present invention, a nut 11 is inserted into and fixed to a cavity portion of each of the above-described terminals 4 arranged in the lid 2 made of the synthetic resin.

Figure 2:
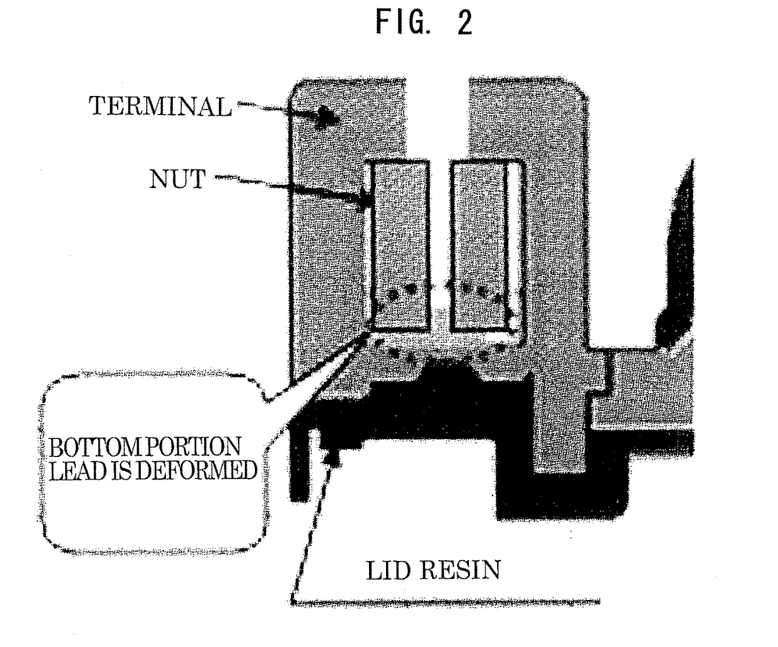
FIG. 2 is a schematic view showing a structure of characterizing portions of a lid for storage battery of the present invention.

As shown in FIG. 2, the nut is inserted into the cavity portion of the terminal, and a bottom portion of the terminal made of lead or lead alloy is deformed by an injection molding pressure when the synthetic resin is injection-molded to form the lid, by which the nut is fixed to the cavity portion of the terminal. According to this method, the nut can be fixed to the cavity portion of the terminal without any process such as welding, caulking and the like, which are physical adhesion methods.

As a material of the lid 2 and the auxiliary lid 9, while thermosetting resin such as polypropylene resin is preferable, another synthetic resin may be used.

Figure 3:
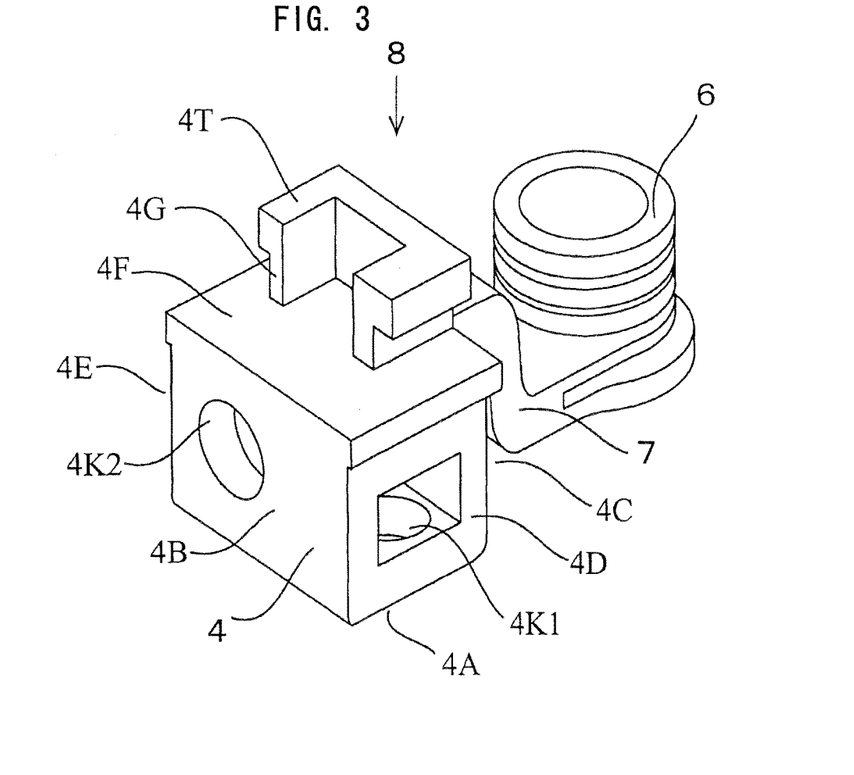
FIG. 3 is a downside perspective view showing one example of a terminal section for storage battery of the present invention.

Moreover, according to the present invention, as shown in FIG. 3, in a terminal section for storage battery 8 made up by integrally molding the terminal 4 having the cavity portion, a tubular bushing 6 into which a pole 5 extending from an element inside the container is inserted to be welded, and a conductive portion 7 joining both, an anchor portion 4T is projected at a location excluding at least a central portion of a bottom portion 4F of the terminal 4, for example, the U-shaped anchor portion 4T having a notch in a central portion thereof is projected with a U-shaped joining portion 4G interposed, the joining portion 4G having an equiform notch.

Figure 4A:
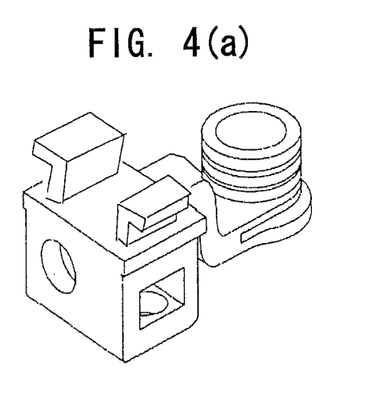
FIG. 4 is a downside perspective view showing other example of the terminal section for storage battery of the present invention.
Figure 4B:
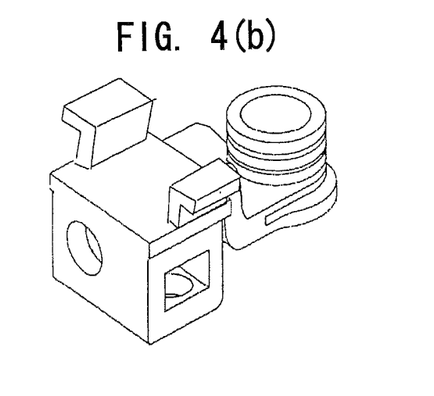
Figure 4C:
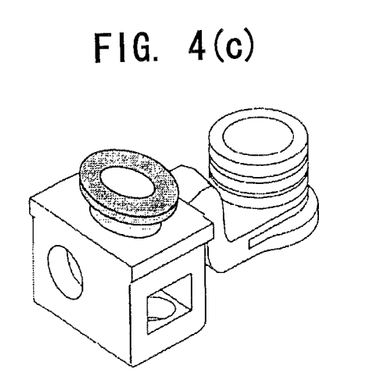
Figure 4D:
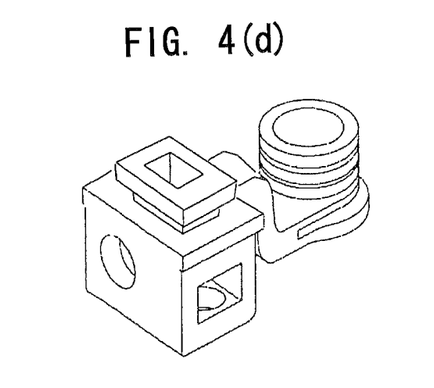
Figure 4E:
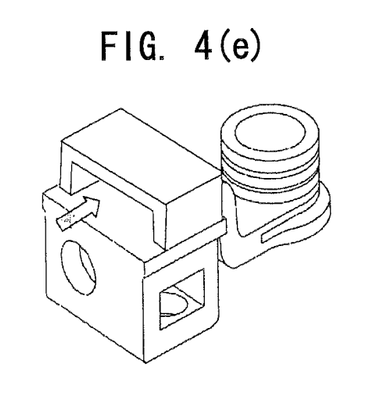
Figure 4F:
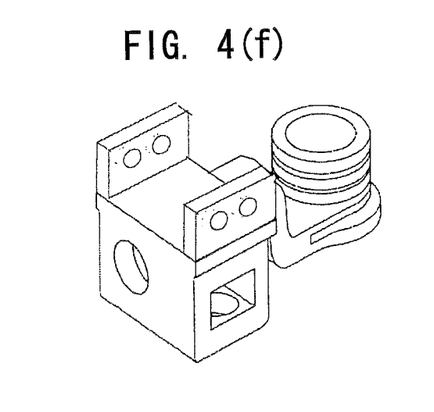
Figure 5:
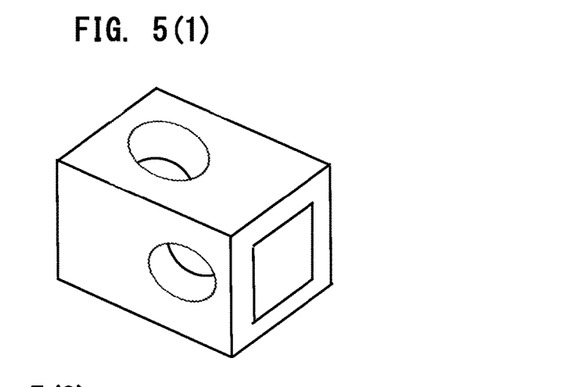

While in a conventional lid for storage battery, as shown in FIG. 7, the plate-like oval anchor portion 4T is integrally formed, which is buried in the resin at the time of lid molding at an lower end of the terminal 4 and exerts an anchor effect, projecting the anchor portion at the center of the bottom portion in this manner makes it difficult to deform the bottom portion of the terminal 4. In the present invention, since the bottom portion of the terminal 4 needs to be deformed as described above, when the anchor portion is projected, as shown in FIG. 3, on the bottom portion 4F of the terminal 4, the anchor portion having the notch in the central portion, for example, the U-shaped anchor portion 4T, in which the central portion of a plate is largely notched, thereby removing a thickness of the central portion, is projected, so that the bottom portion of the terminal with a small thickness corresponding to the notch is deformed. In the present invention, the anchor portion does not need to cover the whole surface of the bottom portion of the terminal, but the deformable portion having the small thickness only needs to be left on the bottom portion of the terminal, and thus, the anchor portion is not limited to the U shape, but may have a notch having another shape, or as shown in FIG. 4, the anchor portion only needs to be projected at the location excluding at least the central portion of the bottom portion. That is, in FIG. 4, FIGS. 4(a) and 4(b) each show the anchor portion in which a bottom of the U shape shown in FIG. 3 is removed, and the central portion is a space, thereby forming right and left two rows (in FIG. 4(a), the right and left two rows are in portions closer to the central portion, excluding ends, and in FIG. 4(b), the two rows are projected at the ends), FIGS. 4(c) and 4(d) each show the anchor portion having a hole in place of the notch in the central portion (in FIG. 4(c), a circular hole and in FIG. 4(d), a square hole), FIG. 4(e) shows the anchor portion in which the right and left two rows are connected (the resin needs to enter a portion indicated by an arrow ahead in order to deform the bottom portion), and FIG. 4(f) shows the vertical plate-like anchor portion in the right and left two rows located at the ends (the resin enters holes of a plate-like body to exert the anchor effect). Employment of these anchor portions allows at least the central portion of the bottom portion of the terminal to be deformed.

The anchor portion 4T having the notch or the hole in the central portion, and the anchor portion in the two rows having a space in the central portion are each integrally formed with a larger dimension than that of the joining portion 4G in a planar view at a lower end of each of the joining portion 4G having the equiform notch or hole and the joining portion in the two rows having the same space portion as that of the anchor portion, the joining portions each extending downwardly from the flat plate-like bottom portion 4F formed integrally at the lower end of the terminal 4, as shown in FIG. 3, FIGS. 4(c) and 4(d), and FIGS. 4(a) and 4(b). In the case of the anchor portion having another shape as well, similarly, the integral formation is enabled. The anchor portion can be formed separately to be integrated with the lower end of the terminal 4 by welding or the like.

In the present invention, since the nut is fixed to the cavity portion of the terminal, unlike the conventional storage battery, a technique cannot be used, in which any one of through-holes in a top plate (upper surface plate portion) and in a front plate portion (front surface plate portion) is selected as the through-hole of the terminal to which an external leading wire is to be connected, and an orientation of the nut is changed to reinsert the nut into the cavity portion of the terminal so as to mach the selected through-hole and a screw hole of the nut.

Accordingly, the terminal and the nut are constituted as follows.

As shown in FIGS. 1, 3, 5 (1), the terminal 4 has a rectangular parallelepiped shape with the cavity portion, and includes the rectangular upper surface plate portion 4A, and a rectangular front surface plate portion 4B, a rectangular rear plate portion 4C, a left plate portion 4D, and a right plate portion 4E, these four plate portions extending downwardly from four sides of this upper surface plate portion 4A, and through-holes 4K1, 4K2 to cause bolts to penetrate are formed in the upper surface plate portion 4A and the front surface plate portion 4B, and further, in the right plate portion 4E, a square socket to insert the nut into the cavity portion from a lateral direction is formed. At this time, when the nut 11 is inserted into the cavity portion of the terminal 4, the one through-hole 4K1 is formed at a left-hand position in the rectangle, and the other through-hole 4K2 is formed at a right-hand position in the rectangle, lest screw holes 11K1, 11K2 of the nut communicating with the through-holes 4K1, 4K2 of the terminal 4 intersect with each other.

As shown in FIGS. 1 and 5(2), the nut 11 to be inserted into the terminal 4 also has a rectangular parallelepiped shape, and the nut 11 is formed with the screw holes at the two locations of the location 11K1 from a rectangular upper surface toward a lower surface, and the location 11K2 from a rectangular front surface toward a back surface. At this time, as to the screw holes 11K1, 11K2 at the two locations, one of the screw holes is formed at a left-hand position in the rectangle and the other screw hole is formed at a right-hand position of the rectangle, lest they intersect with each other.

Figure 6A:
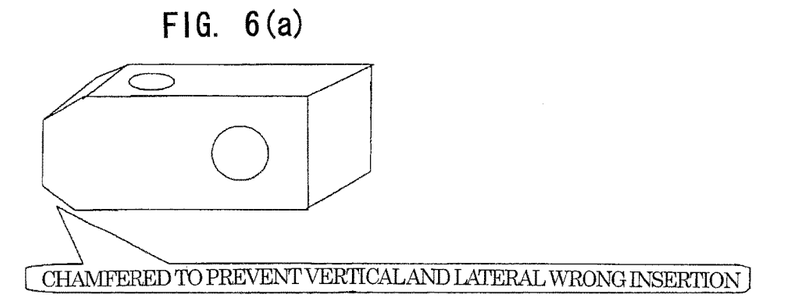
FIG. 6 is a perspective view showing one example of the nut to be inserted into the terminal of the storage battery of the present invention.
Figure 6B:
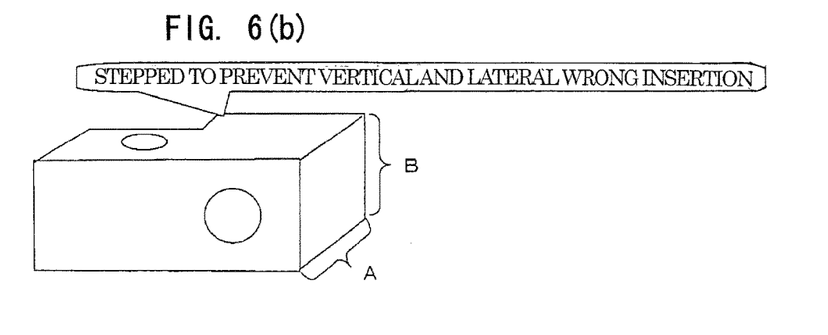

The terminal 4 is not limited to the rectangular parallelepiped, but the right and left terminals may not necessarily be similar in shape, and the position of the through-hole 4K1 in the upper surface plate portion 4A and the position of the through-hole 4K2 in the front surface plate portion 4B are not limited to the illustration. Moreover, the nut is not limited to the rectangular parallelepiped shape, either, but as shown in FIG. 6, in order to enable wrong insertion in the vertical or horizontal direction to be prevented, a chamfered nut or a stepped nut may be used. Moreover, it can also be considered that a lateral dimension A and a longitudinal dimension B in FIG. 6(b) are changed to prevent the wrong insertion. Furthermore, if the nut 11 has a cubic shape with enough size to prevent the screw holes 11K1, 11K2 from intersecting with each other, the positions need not be biased, and if only one of the screw holes is used, the screw holes 11K1, 11K2 may intersect with each other.

In the present invention, the rectangular parallelepiped shape as collective designation includes the above-described anomalous ones and cubic ones, and as to the surface thereof, the rectangular shape as collective designation also includes anomalous ones and square ones.

By inserting the nut 11 into the cavity portion of the terminal 4 as described above through the square socket of the left plate portion 4D shown in FIG. 1 and fixing the same, the lid 2 can be obtained, in which the through-hole 4K1 of the terminal 4 and the screw hole 11K1 of the nut 11 communicating with the through-hole 4K1 are formed at the location from the rectangular upper surface 4a toward the lower surface (the bottom surface 4F), and the through-hole 4K2 of the terminal 4 and the screw hole 11K2 of the nut 11 communicating with the through-hole 4K2 are formed at the location from the rectangular front surface (the front surface plate portion 4B) toward the back surface (the rear plate portion 4C), and the holes at the two locations are formed at the positions where they do not intersect with each other.

With the above-described constitution of the lid 2, the bolt (not shown) can be inserted from any one or both of the through-holes 4K1 in the upper surface and 4K2 in the front surface so that terminal end of the bolt can be screwed into the nut. The external leading wire (a wire connectable to an electric component or the like) not shown or the like is sandwiched and fixed between the bolt and the nut.

The holes can be provided at three or more locations in place of at the two locations, as needed. Moreover, since the nut is fixed to the cavity portion of the terminal in the present invention, the present invention can be applied to a terminal where the hole is provided at one location.

A basic structure of the lid for battery storage of the present invention is similar to the conventional one shown in FIG. 7. Hereinafter, based on FIG. 7, the structure of the lid for storage battery of the present invention will be described. Inside the lid 2 are included the tubular bushings 6 each of which the pole 5 extending from the element (not shown) of the container 1 to extract electric power is inserted into to be welded. The conductive portion 7 to join an upper side of the bushing 6 and a lower side of the terminal 4 horizontally apposed to the bushing 6 is included, and the terminal 4, the bushing 6 and the conductive portion 7 are integrally molded, using lead or lead alloy to thereby make up a terminal section 8. Reference numeral 5A shown in FIG. 7 denotes a strap integrated with a lower end of the pole 5. Moreover, a blacked-out portion B in the figure denotes a welded portion where the bushing 6 and the pole 5 are subjected to burner welding, which is advantageous in terms of strength as compared with soldering.

Furthermore, the rectangular auxiliary lid 9 to cover the bushings 6 included inside the lid 2 from above, that is, to close an opening of the upper end 2A of the lid 2 is included. This auxiliary lid 9 is put over the lid 2 after thermally melting a lower side of the auxiliary lid 9, by which the auxiliary lid 9 can be firmly fixed in a state where the opening of the lid 2 is sealed closely. That is, after thermally melting a lower side of a rib 9R (9r) of the auxiliary lid 9, a skirt portion 9S of the auxiliary lid 9 is put into a groove portion 2M, and the rib 9R (9r) of the auxiliary lid 9 is pressed to a rib 2R (2r) of the lid 2 to thereby weld the rib 9R (9r) of the auxiliary lid 9 to the rib 2R (2r) of the lid 2, which can put an inside surrounded by the ribs 9R (9r), 2R (2r) into a closely sealed state.

Lower portions 6B excluding upper portions 6A of the bushings 6 in the terminal sections 8, and the conductive portions 7 are buried in the lid 2 by insert molding. Vertical plate portions 7B of the conductive portions 7 are covered with bulging portions 2F, 2F bulging from a vertical plate portion 2C of the lid 2 to the terminal 4 side. The bushings 6 are insert-molded into the lid 2 as described before, and further, a plurality of annular protruded portions 6T are preferably included along the vertical direction outside each of the bushings 6. This makes it difficult for electrolyte solution from the storage battery 10 to move into an upper space K of the lid 2 from between each of the bushings 6 and the lid 2, and even if the electrolyte solution moves from between the bushing 6 and the lid 2 into the upper space K of the lid 2, it is difficult for the electrolyte solution to leak out to a surface of the auxiliary lid 9 (outside the storage battery 10), because the inside surrounded by the rib 9R (9r), 2R (2r) is put into the closely sealed state.

Each of the conductive portions 7 is made up of a first horizontal plate portion 7A extending horizontally from an upper portion of the bushing 6, the vertical plate portion 7B extending downwardly from an end portion of this first horizontal plate portion 7A, and a second horizontal plate portion 7C extending horizontally from a lower end of this vertical plate portion 7B to be connected to a lower portion of the terminal 4, and two (one, or three or more) annular protruded portions 7T protruded outwardly in the vicinity of a central portion of the vertical plate portion 7B may be included at predetermined intervals. In this case, as described before, the electrolyte solution that has moved into the upper space K of the lid 2 can be more surely prevented by the protruded portions 7T, 7T from moving to the terminal 4 through a gap between the conductive portion 7 and the bulging portion 2F of the lid 2. Since the protruded portions 7T are to prevent the movement of the electrolyte solution to the terminal 4, a shape that can make a creepage distance longer, for example, annular depression portions may be employed, or this annular depressed portion and the annular protruded portion 7T may be combined.

The terminal section for storage battery of the present invention shown in FIG. 3 is manufactured by the following method.

The terminal 4, the bushing 6, and the conductive portion 7 are integrally molded, employing a casting process of lead or lead alloy to thereby manufacture the terminal section 8. It is preferable that the lead or the lead alloy is cast, using a die so that the rectangular parallelepiped terminal 4 has the cavity portion, and in the terminal 4, the through-holes 4K1, 4K2 are formed at the right and left-hand positions of the rectangular upper surface plate portion 4A and the rectangular front surface plate portion 4B, and the U-shaped anchor portion 4T is projected on the bottom portion 4F of the terminal 4 with the U-shaped joining portion 4G interposed.

A method can be employed, in which molten lead or molten lead alloy is poured into a portion where the terminal 4 is manufactured, and a portion where the bushing 6 is manufactured in the die to manufacture the terminal section 8. Since the conductive portion 7 to join the upper side of the bushing 6 and the lower side of the terminal 4 apposed horizontally to the bushing 6 is connected in such a manner that the die is connected so as to vertically reverse postures of the bushing 6 and the terminal 4, the conductive portion 7 is formed of the molten metal on the bushing 6 side or the molten metal overflowing from the terminal 4 side.

As the lead alloy, Pb—Ca—Sn alloy, Pb—Sn alloy, Pb—Ca alloy, Pb—Sb alloy or the like can be used.

When the terminal section 8 manufactured as described above is used to manufacture the lid for storage battery 2, the nut 11 having the screw holes at the two locations is inserted into the cavity portion of the terminal 4 having the through-holes at the two locations so that the through-hole 4K1 of the terminal and the screw-hole 11K1 of the nut, and the through-hole 4K2 of the terminal and the screw-hole 11K2 of the nut communicate with each other, respectively. The terminal sections 8 each with the nut 11 inserted as described above are inserted into a molding die of the lid 2 to injection-mold the synthetic resin. As shown in FIG. 2, the bottoms of the terminals made of the lead or lead alloy are deformed by the injection molding pressure, and the nuts 11 are fixed to the cavity portions of the terminals 4, by which the lid for storage battery 2 of the present invention shown in FIG. 1 is manufactured.

In the present invention, by employing the injection molding method of the lid 2 as described above, the lid for storage battery 2 is obtained, in which at least the lower portions 6B of the bushings and the conductive portions 7 in the terminal sections 8 each resulting from integrally molding the terminal 4, the bushing 6 and the conductive portion 7 are buried in the lid 2 by the insert molding, and the bottom portions of the terminals 4 are deformed by the injection molding pressure of the synthetic resin at the time of the insert molding, so that the nuts 11 are pressed and fixed to the cavity portions of the terminals 4. In the case where the anchor portion 4T having the U shape or the like is projected at the location excluding at least the central portion of the bottom surface 4F of each of the terminals 4, the bottom portion 4F of the terminal 4 corresponding to the notch included in the anchor portion 4T having the U shape or the like is deformed, and the nut 11 is pressed and fixed to the cavity portion of the terminal 4.

The lid for storage battery of the present invention can be applied to a container of a normal lead-acid battery, that is, the container made of synthetic resin, in which an inside thereof is partitioned into a plurality of cells by partition walls, an element is contained in each of the cells, and the poles extending from the elements are included, and as described above, the poles 5 extending from the elements inside the container 1 are welded to the bushings 6 of the lid 2 put over from above, which enables the electric power to be extracted.

DESCRIPTION OF REFERENCE NUMERALS 1 container
2 lid
2A upper end
2B bottom surface
2C vertical plate portion
2F bulging portion
2M groove portion
2R(2r) rib
3 notched portion
4 terminal
4A top plate portion (upper surface plate portion)
4B front plate portion (front surface plate portion)
4C rear plate portion
4D left plate portion
4E right plate portion
4F bottom portion
4G joining portion
4K1, 4K2 through-hole
4T anchor portion
4a upper surface
5 pole
6 bushing
6A upper portion
6B lower portion
6T protruded portion
7 conductive portion
7A horizontal plate portion
7B vertical plate portion
7C horizontal plate portion
7T protruded portion
8 terminal section
9 auxiliary lid
9R (9r) rib
9S skirt portion
10 storage battery
11 nut
11k1, 11k2 screw hole
B welded portion
K space

INDUSTRIAL APPLICABILITY

The storage battery of the present invention includes the lid for storage battery and the terminal section of the present invention, and by employing the specific injection molding method of the lid, trouble of inserting the nuts into the cavity portions of the terminals can be saved, and the falling of the nuts can be prevented at the time of connection of the external leading wires, which make the storage battery useful as a storage battery for motorcycle.

The invention claimed is:

1. A terminal section for a storage battery which is made up of a terminal having a cavity portion into which a nut is inserted, a bushing, and a conductive portion joining both, wherein
the terminal comprises plates,
an anchor portion and a joining portion are projected at a surface of one plate of the terminal excluding at least a central portion of the surface of the one plate of the terminal,
the anchor portion and the joining portion are projected in a direction intersecting with the surface of the one plate,
the joining portion is in direct contact with the surface of the one plate of the terminal and the anchor portion is in direct contact with the joining portion,
the central portion of the surface of the one plate is surrounded by at least one of the anchor portion or the joining portion, and
the central portion of the one plate of the terminal is configured to be deformed due to an injection molding-pressure.

2. The terminal section for a storage battery according to claim 1, wherein the anchor portion has a notch or a hole in a central portion of the anchor portion, and the joining portion has a notch or a hole in a central portion of the joining portion.

3. The terminal section for a storage battery according to claim 2, wherein the anchor portion having the notch in the central portion has a U shape.

4. The terminal section for a storage battery according to claim 1, wherein the anchor portion has a larger dimension in a direction parallel to the surface of the one plate than the joining portion.

5. The terminal section for a storage battery according to claim 1, wherein the central portion is surrounded by the anchor portion.

6. The terminal section for a storage battery according to claim 1, wherein the central portion is surrounded by the joining portion.

7. The terminal section for a storage battery according to claim 1, wherein at least a portion of the anchor portion is projected in a direction perpendicular to the surface of the one plate.

8. The terminal section for a storage battery according to claim 1, wherein at least a portion of the joining portion is projected in a direction perpendicular to the surface of the one plate.

9. The terminal section for a storage battery according to claim 1, wherein at least a portion of the anchor portion and at least a portion of the joining portion are projected in a direction perpendicular to the surface of the one plate.

10. A lid for a storage battery in which the terminal section of claim 1 is insert-molded in a lid made of synthetic resin, wherein a nut is inserted into the cavity portion of the terminal to be inserted-molded, by which the nut is fixed.

11. The lid for a storage battery according to claim 10, wherein the one plate of the terminal is deformed by an injection molding pressure of the synthetic resin at the time of the insert molding, and the nut is pressed and fixed to the cavity portion of the terminal.

12. The lid for a storage battery according to claim 11, wherein the anchor portion has a notch or a hole in a central portion of the anchor portion, and the joining portion has a notch or a hole in a central portion of the joining portion.

13. The lid for a storage battery according to claim 12, wherein the anchor portion having the notch in the central portion has a U shape.

14. The lid for a storage battery according to claim 10, wherein at least the central portion of the one plate of the terminal where the anchor portion is not projected is deformed, by which the nut is pressed and fixed to the cavity portion of the terminal.

15. The lid for a storage battery according to claim 10, wherein the terminal and the nut inserted into the cavity portion of the terminal each have a rectangular parallelepiped shape, and through-holes of the terminal and screw holes of the nut communicating with the through-holes are respectively formed at least at two locations of a location from a rectangular upper surface toward a lower surface, and a location from a rectangular front surface toward a back surface, and at positions where the holes do not intersect.

16. An injection molding method of the lid for a storage battery of claim 10, the method comprising:
injection molding of the lid of the synthetic resin where a nut is inserted into the cavity portion of the terminal, and
deforming the one plate of the terminal by an injection molding pressure to thereby fix the nut to the cavity portion of the terminal.

17. The injection molding method according to claim 16, wherein in the one plate of the terminal, the anchor portion has a notch or a hole in a central portion of the anchor portion, and the one plate of the terminal corresponding to the notch or the hole is deformed.

18. The injection molding method according to claim 16, wherein the terminal and the nut to be inserted into the cavity portion of the terminal each have a rectangular parallelepiped shape, through-holes of the terminal are formed at least at two locations of a rectangular upper surface plate portion and a rectangular front surface plate portion, and screw holes of the nut are formed at least at two locations of a location from a rectangular upper surface toward a lower surface and a location from a rectangular front surface to a back surface, and at positions where the holes do not intersect, and the nut is inserted into the cavity portion of the terminal so that the through-holes of the terminal and the screw holes of the nut communicate with each other.

19. A storage battery including a container made of synthetic resin in which an inside thereof is partitioned into a plurality of cells by partition walls, and an element is contained in each of the cells, and the lid of claim 10 to cover the container from above.

20. A terminal section for a storage battery which is made up of a terminal having a cavity portion into which a nut is inserted, a bushing, and a conductive portion joining both, wherein
the terminal comprises plates,
an anchor portion and a joining portion are projected at a first surface of one plate of the terminal excluding at least a central portion of the first surface of the one plate of the terminal,
the anchor portion and the joining portion are projected in a direction intersecting with the first surface of the one plate,
the joining portion is in direct contact with the first surface of the one plate of the terminal and the anchor portion is in direct contact with the joining portion, one surface of the nut is in direct contact with a second surface of the one plate of the terminal, the second surface being opposite to the first surface of the one plate of the terminal, the central portion of the first surface of the one plate is surrounded by at least one of the anchor portion or the joining portion, and the central portion of the first surface of the one plate of the terminal is configured to be deformed due to an injection molding-pressure.

* * * * *